United States Patent [19]

Vanacore

[11] Patent Number: 4,691,346

[45] Date of Patent: Sep. 1, 1987

[54] PBX INTEGRITY ARRANGEMENT FOR MAINTAINING THE FUNCTIONAL INTEGRITY OF PBX COMMUNICATION DEVICES AND ASSOCIATED FACILITIES

[75] Inventor: Vincent D. Vanacore, Boulder, Colo.

[73] Assignee: American Telephone and Telegraph Company and AT&T Information System Inc., Holmdel, N.J.

[21] Appl. No.: 836,912

[22] Filed: Mar. 6, 1986

[51] Int. Cl.$^4$ ............................................. H04M 1/66
[52] U.S. Cl. ..................................... 379/198; 379/188
[58] Field of Search ....................... 379/10, 11, 32, 34, 379/101, 112, 188, 198, 196

[56] References Cited

U.S. PATENT DOCUMENTS

| | | | |
|---|---|---|---|
| 3,996,425 | 12/1976 | Low et al. | 379/198 |
| 4,064,372 | 12/1977 | Altenburger | 379/196 |
| 4,096,356 | 6/1978 | Burtness et al. | 379/198 |
| 4,485,437 | 11/1984 | Kinghorn | 364/200 |
| 4,517,554 | 5/1985 | Moser et al. | 340/514 |
| 4,523,183 | 6/1985 | Frick | 340/507 |
| 4,536,748 | 8/1985 | Tonello | 340/506 |

Primary Examiner—Stafford D. Schreyer
Attorney, Agent, or Firm—Donald M. Duft

[57] ABSTRACT

The disclosed PBX integrity arrangement utilizes a specialized processing operation to provide an integrity check for communication devices and trunk facilities connected to a PBX. The integrity check determines (1) whether a user of a device or a trunk facility is permitted access to one or more PBX operations or (2) whether the PBX operation meets expected conventional PBX call establishment conditions. If access is prohibited or an atypical condition is present, this access or condition may indicate permission tampering, device or trunk facility misuse, malfunction or unauthorized PBX user activity. The occurrence of any one of the above conditions produces an immediate response which either remedies the occurrence or provides notification of the occurrence of the condition to a PBX administrator.

21 Claims, 9 Drawing Figures

| STATION IDENTITY | ASSOCIATED VALID STATES | | | |
|---|---|---|---|---|
| 100-0 | $V_0$ | $V_1$ | ... | $V_n$ |
| 100-1 | $V_0$ | $V_1$ | ... | $V_n$ |
| ... | ... | ... | ... | ... |
| 100-n | $V_0$ | $V_1$ | ... | $V_n$ |

TABLE 1

| IDENTIFIED VALID STATES |
|---|
| $V_0$ |
| $V_1$ |
| ... |
| $V_n$ |

TABLE 2

| IDENTIFIED INVALID STATES |
|---|
| $IV_0$ |
| $IV_1$ |
| ... |
| $IV_n$ |

TABLE 3

| TRANSITION TO INVALID STATE (MINIMUM TIME) |
|---|
| $IV_{0(min)}$ |
| $IV_{1(min)}$ |
| ... |
| $IV_{n(min)}$ |

TABLE 4

| TRANSITION TO INVALID STATE (MAXIMUM TIME) |
|---|
| $IV_{0(max)}$ |
| $IV_{1(max)}$ |
| ... |
| $IV_{n(max)}$ |

TABLE 5

| UNKNOWN CONDITION OR $IV_{max}^{min}$ | NOTIFICATION ACTION |
|---|---|
| $IV_0$ | |
| $IV_{0(min)}$ | |
| ... | ... |
| $IV_{n(max)}$ | |

TABLE 6

| $IV_{max}^{min}$ | IMMEDIATE ACTION |
|---|---|
| $IV_{0(max)}$ | |
| $IV_{1(max)}$ | |
| ... | ... |
| $IV_n$ | |

TABLE 7

PBX INTEGRITY ARRANGEMENT FOR MAINTAINING THE FUNCTIONAL INTEGRITY OF PBX COMMUNICATION DEVICES AND ASSOCIATED FACILITIES

TECHNICAL FIELD

This invention relates to a Private Branch Exchange (PBX) or a communication system and, in particular, to an arrangement for preventing the improper use of the PBX and for determining the functional integrity of a plurality of communication devices and associated trunk facilities connected to the PBX.

BACKGROUND OF THE INVENTION

A Private Branch Exchange (PBX) or a communication system typically serves a plurality of different types of communication devices such as stations, attendant consoles, printers, terminals, and trunk facilities such as Central Office (C.O.) trunks. The PBX or the system offers the device and trunk facility users access to a variety of call features. Access to these features is dependent on the authorization level of each devices or trunk facility; that is, users are permitted access either to all, some or none of the features. However, a user who is not permitted access to all features may sometimes attempt to circumvent the restriction and, if successful, gain access to unauthorized features.

One example of where restrictions on call features may be present is a hotel. Hotels usually restrict the placement of long-distance cells from guest stations. Each guest station of the hotel PBX is assigned a restriction which prevents the guest from making long-distance calls without going through proper billing facilities. A "clever" guest may sometimes attempt to circumvent the long-distance restriction and place unauthorized long-distance calls that circumvent the billing facilities. The placement of these unauthorized long-distance calls defeats the maintenance of accurate billing records and is costly to the hotel.

Another example of accessing unauthorized PBX features may be found in a corporate environment where selective restrictions may exist on some, but not all, devices such as stations. An executive, for example, may be permitted access to a call forwarding feature while a non-executive is not permitted such access. Non-executives are restricted because excessive call fowarding is burdensome to the operation of the PBX. Therefore, each non-executive station is assigned a restriction which prohibits call forwarding. Circumventing the restriction burdens the operation of the PBX.

The PBX or communication system also provides well defined call establishment capabilities. Each cell establishment operation conforms to a precribed set of conventional conditions. If the conventional conditions are not met, then "atypical" call establishment conditions exist. Atypical conditions often indicate either communication device or facility misuse, communication device or facility failure or improper or unauthorized PBX user activity.

An example of typical vs atypical conditions is described with respect to the operation of dialing from a device such as a station. A calling party, typically, makes one or two call attempts to reach other PBX stations over some specified period of time, e.g. two call attempts per hour. However, if a calling party utilizes an electronic automatic dialer, the number of attempts and the speed at which attempts are made increase dramatically over the specified period of time, e.g. 60 call attempts or more per hour. In the latter case, the call establishment conditions are atypical. The existence of the atypical condition may be indicative of improper PBX operation or unauthorized PBX user activity. For example, an automatic dialer is sometimes used to find a computer access number to gain unauthorized access to a computer data bank.

Another example of typical vs atypical conditions is described with respect to the length of time a trunk remains busy. Typically, a trunk remains busy for some expected duration of time, e.g. 40 minutes. However, the existence of a trunk busy condition for 24 hours is atypical. The presence of this atypical condition may indicate that a user is attempting to "tie-up" the trunk facilities. The presence of this condition may also indicate that a station's receiver was accidentally knocked "off-hook". This atypical condition indicates either device or facility misuse or failure.

The above-cited examples of restriction tampering and device or trunk facility misuse, failure, or unauthorized or improper PBX user activity are clearly the type of activities or occurrences that should advantageously be made known to a PBX administrator. It would also be advantageous if such activities or occurrences could be easily and immediately detected so that appropriate remedial action could be taken. Heretofore, no such method existed for addressing the above-cited considerations and problems with respect to accessing PBX features or detecting the occurrence of atypical PBX call establishment conditions.

SUMMARY OF THE INVENTION

A PBX integrity processing algorithm arrangement is disclosed which overcomes the above-stated problems and considerations. The disclosed arrangement provides a continual integrity check on each station device and trunk facility serves by a PBX or a communication system to detect either prohibited feature accessing attempts or atypical conditions or states in establishing calls. The occurrence of these attempts or states indicate either restriction tampering, device or trunk facility misuse, or improper or unauthorized PBX user activity. In response to the detection of any of these occurrences, the arrangement provides for immediate remedial action and for immediate notification action.

The disclosed arrangement comprises a specialized memory structure and an integrity processing algorithm which utilizes the contents of the memory structure in order to perform an integrity check on each station device or trunk facility of the PBX. The memory structure includes a number of tables. One table comprises a list of valid states where each state is associated with permitted access to a specified one of the features of the PBX. A second table comprises a list of invalid states where each state is associated with prohibited access to a specified one of the PBX features. A third and fourth table comprise a list of atypical states where each state is associated with atypical call establishment conditions. A fifth and sixth table comprise a list of responses where esch response is associated with one of the invalid or atypical states. The table indicates whether the detected invalid or atypical state requires immediate remedial action or notification action, or both. A control processor accesses a main memory containing these tables, and administers the PBX integrity algorithm to determine the integrity of each device or trunk facility connected to the PBX.

The following discussion is applicable to all station devices or trunk facilities; however, for ease of description, only stations are discussed. Assume that all PBX stations can access the same set of features; that is, each station has the same restrictions. Assume further that only a single station of the PBX is under scrutiny at a time. The control processor scans the station and detects the current state of that station. The current state indicates which feature is currently being accessed by the station. The control processor then compares the detected current state with the states listed in the valid states table. If a match occurs between the detected current state and one of the listed valid states, the current access to the associated feature is permitted. However, if no match occurs, the control processor compares the detected current state with the states listed in the invalid states table. If a match occurs, the current access to the associated feature is prohibited. An example is, a user who places an unauthorized long-distance call. The control processor, following the occurrence of the match to an invalid state, scans the response table to determine the appropriate action to the existence of the invalid state.

In addition to checking for valid and invalid states, the control processor also detects the occurrence of atypical states. The occurrence of an atypical state is determined with respect to the time that a station normally remains in atypical state. The time duration that a station remains in atypical state may be either too short or too long and therefore, not conform to typical conditions associated with normal call establishment conditions. An example is, the existence of a station busy for 24 hours. The control processor sans the station to detect the amount of time that the station exists in its current state. The control processor, then, compares the detected duration of the current state with the list of durations included in the atypical state's table. If no match occurs, typical call establishment conditions exist. However, if a match occurs, atypical conditions exist. The detection of an atypical state may indicate station misuse, failure or unauthorized or improper PBX user activity. The control processor following the occurrence of the match to an atypical state, scans the response tables to determine the appropriate action to the existence of the atypical state.

In the above-described manner, the PBX integrity algorithm performs integrity checks on each station of the PBX to detect an occurrence of unauthorized feature access or atypical call establishment conditions. These occurrences or conditions indicate restriction tampering, station misuse, station failure or unauthorized PBX station activity. In response to the detection of these occurrences or conditions, an immediate response, either of the notification-type or remedial action-type, occurs.

DETAILED DESCRIPTION

Figure 1:
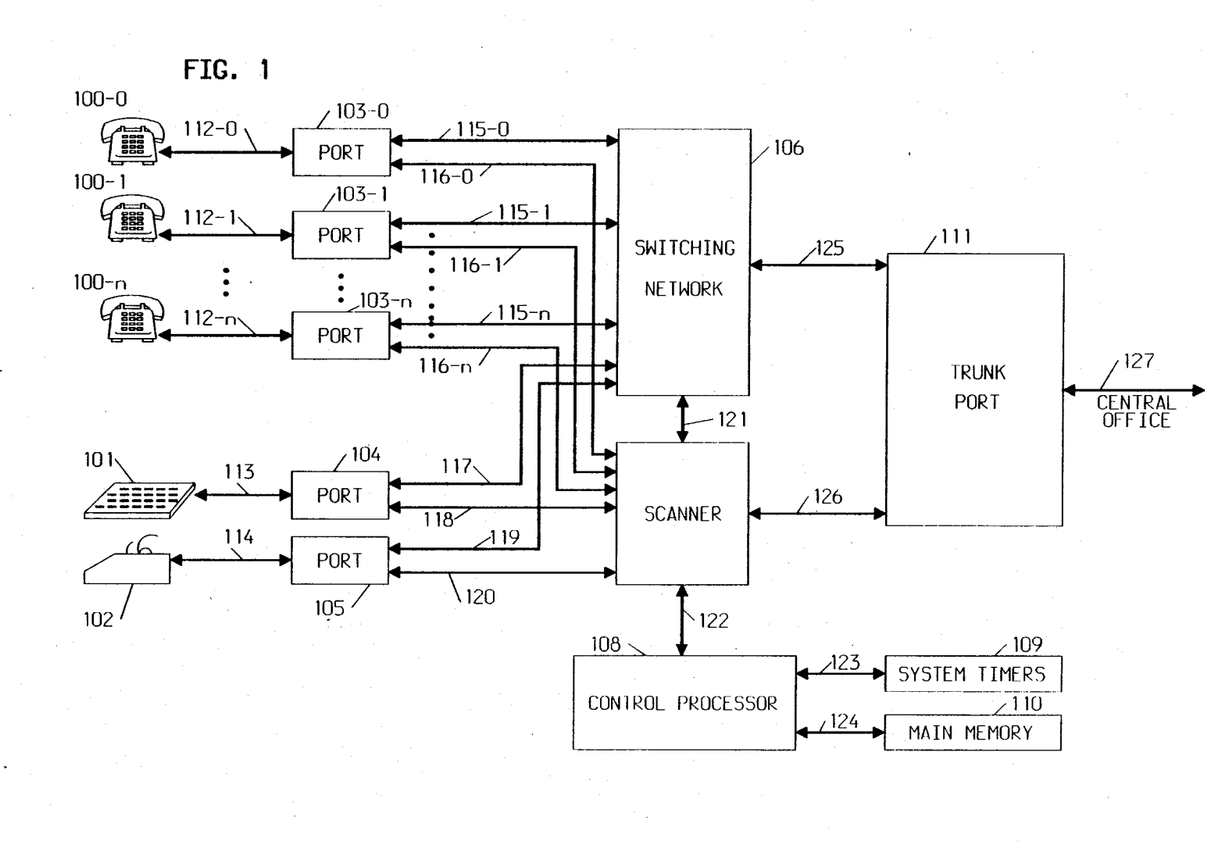
FIG. 1 illustrates a Private Branch Exchange (PBX)

FIG. 1 discloses a typical private branch exchange (PBX) comprising a plurality of communication devices such as station sets 100-0 through 100-n, attendant console 101 and printer 102. These communication devices connect to ports 103-0 through 103-n, 104 and 105 over paths 112-0 through 112-n, 113 and 114.

Port circuits 103-0 through 103-n, 104, and 105 interface with switching network 106, scanner 107 and control processor 108. Control processor 108 is of the stored-program type and controls the interconnections between the communication devices of FIG. 1. For ease of discussion, the remainder of this description uses the term station to refer to the various types of communication devices. Processor 108 connects to main memory 110 over path 124. Memory 110 contains various operational processing algorithms which are implemented in response to a stimulus received from the stations of the PBX. A stimulus may indicate an "off-hook" or "on-hook" condition of a station. A stimulus also provides an indication of the current state of a station or the currently accessed processing operation associated with the station. For example, an "on-hook" stimulus indicates that a station is "idle" and currently, not accessing any processing operation and an "off-hook" stimulus indicates that a station is "busy" and currently, engaged in some call processing operation such as C.O. access. Scanner 107 operates under control of processor 108. Scanner 107 scans port circuits 103-0 through 103-n, 104 and 105 to detect the appearance of a stimulus, e.g. "on-hook" or "off-hook" over paths 116-0 through 116-n, 118 and 120 as generated from any one of the stations 110-0 through 100-n, 101 and 102. These signals, which are generated in response to a stimulus, indicate the condition of the stations. Scanner 107 detects each change in stimulus, for example, a change from an "on-hook" condition to an "off-hook" condition, and applies an indication of the stimulus to processor 108 over path 122. Processor 108 responds to the receipt of this stimulus indication and implements routine operational processing algorithms. Processor 108, also, generates control information to establish connections between the stations of the PBX.

These connections are established via switching network 106 which exchanges information, i.e., "voice or data", between the stations comprising each connection. Switching network 106 operates under control of processor 108 via scanner 107 over paths 122 and 121, respectively, and is advantageously of the digital type. Network 106 includes a time slot interchanger such as the type described in U.S. Pat. No. 4,112,258 issued to H. G. Alles on Sept. 5, 1978 and U.S. Pat. No. 4,485,469 issued to R. K. Witmore on Nov. 27, 1984. A time slot interchanger (not shown) connects one line port with another line port during an assigned time slot. The assigned time slot provides for information exchange between each of the line ports having an associated station to establish and maintain a connection between a calling and a called station.

Processor 108, additionally, controls system timers 109 over path 123. System timers 109 comprise a plurality of timers. These timers include duration of state timers (not shown) and actual time-of-day timers (not shown). System timers 109 are discussed subsequently.

The following discussion briefly describes the process of establishing connections between the stations of the PBX of FIG. 1. Processor 108 responds to an "off-hook" stimulus indication as received from a calling station, e.g. station 100-1, via scanner 107. A party at calling station 100-1, then, dials destination digits identifying a called station, e.g. station 100-n, of the PBX. Processor 108 identifies the called station in response to the receipt of the "dialed" digits and assigns a specific time slot for the connection in switching network 106. Processor 108 generates connection control data to the network 106 assigned time slot via scanner 107 over path 121 to complete the connection between the calling and called parties. Control processor 108 notifies the called station of the completed call connection by, for example, applying a ringing indication to the called station. Concurrently, processor 108 applies a ring-back indication to the calling station to indicate a completed call connection. The ringing and ring-back generators are not shown since these generators comprise no part of the subject invention. The ringing and ring-back indications are applied to the called and calling station, respectively, via the assigned time slot for the connection. Assume that the called station goes "off-hook", scanner 107 detects this "off-hook" stimulus at the called station and applies an indication of this stimulus to processor 108 over path 122. Processor 108 responds to this indication and removes ringing and ring-back from the connection between the calling and the called stations. Switching network 106 maintains the assigned time slot for the connection so that the calling and called station can exchange "voice and/or data" during the established connection.

During the processing of each connection, the duration timers comprising system timers 109 time the amount of time each station of the PBX remains in a particular state or the amount of time it takes to access and perform a processing operation associated with that state in response to the generation of a stimulus from a station. Examples of timed states are the amount of time a calling station is "off-hook" prior to dialing digits or generating a service request, the amount of time between dialed digits, the amount of time involved in dialing all the digits of a called station, and the amount of time a station remains busy. A duration timer is activated concurrently with the occurrence of each state or each access to and performance of an associated processing operation of that state. The duration of time associated with each state spans some expected specified time period in which the station typically remains in that state to perform the associated processing operation. If the actual time is shorter than the expected specified time period or longer than the expected specified time period, the atypical time durations may indicate, as previously discussed, station malfunction, station misuse or unauthorized PBX user activity. The duration timers are discussed in further detail subsequently.

As previously indicated, processor 108 contains a number of operational processing algorithms. Processor 108 administers the various interconnections between stations such as the one described above by implementing call processing algorithms. Each call processing algorithm comprises a list of stored instructions which direct routine call processing operations. Call processing establishes and disengages call connections between the various stations comprising the PBX. In addition to routine call processing algorithms, main memory 110 also contains various feature and service processing algorithms. Each feature or service processing algorithm also comprises a list of instructions that specify processing operations for implementing a desired feature or service. The service or feature processing algorithms respond to requests which are generated either by a user that dials a specified feature code or access code, by a user that depresses a specified feature or access button, or by a set of predefined conditions where the feature or service algorithm is automatically implemented when the set of conditions exist. Processor 108 accesses main memory 110 over path 124 in response to the "dialed" code, the "depression" of a button or the "set of conditions", and implements the appropriate feature or service processing algorithm by branching from the routine call processing algorithm to the requested feature or service processing algorithm to satisfy the request.

One such service processing capability of the PBX of FIG. 1 includes accessing trunk facilities such as a Central Office (C.O.) trunk. The C.O. serves to extend incoming and outgoing call connections between at least one station of the PBX and at least one destination station outside of the PBX. Prior to describing the processing operations involved in incoming and outgoing call connections to and from the trunk facilities, the following describes the interconnections between the elements of the PBX and the trunk facilities.

Processor 108 controls connections between the station(s) of the PBX and the trunk port connected to the Central Office (C.O.) of FIG. 1. The PBX connects to trunk port 111 over paths 125 and 126, respectively. A plurality of trunk ports may be connected to the C.O., but, for ease of description, only a single trunk port is illustrated. Incoming and outgoing calls from the C.O. are received and extended over trunk 127 via trunk port 111. Processor 108 establishes interconnections between the stations of the PBX and the C.O. trunk in the same manner previously described with respect to inter-PBX station to station connections.

Briefly, with respect to incoming calls from the C.O. to any one of the stations 100-0 through 100-n, 101 and 102, the C.O. generates a stimulus indicative of an incoming call over path 127 and applies this indication to trunk port 111. Scanner 107 detects the incoming call stimulus from the C.O. over path 126 and applies this stimulus indication to processor 108 over path 122. Processor 108 responds to this stimulus indication and implements call processing operations to satisfy the connection request. The processing operations identify the called station of the PBX associated with the incoming call, assign a time slot to the connection in switching network 106, and establish the connection between the C.O. and the called station via switching network 106. Processor 106 applies a ringing indication to the called station, and sends ring-back to the C.O. in the manner previously described with respect to a station to station connection of the PBX. The called station goes "off-hook" to complete the connection between the C.O. and a calling station. The details of establishing connections between the C.O. and a called station are known and therefore, no further detail is provided.

In the above described manner, incoming calls from the C.O. to any of the stations of the PBX are established. Briefly, with respect to outgoing calls to the C.O. from any one of the stations 100-0 through 100-n, 101 and 102, the calling station generates an "off-hook" stimulus in the manner previously described. Following the "off-hook" condition, a calling party dials a "9" to request C.O. access which indicates that the called station is outside of the PBX. The capability to provide C.O. access is a service processing operation of the type previously described. The processing operation is associated with a prescribed algorithm. Control processor 108, in response to the receipt of a "9", accesses and then, implements the prescribed algorithm to make the station to C.O. connection. Processor 108 scans the C.O. via scanner 107 over path 127 as extended through trunk port 111 to determine C.O. availability. In response to C.O. availability, processor 108 establishes the connection between the calling station of the PBX and the C.O. in the manner previously described with respect to station-to-station PBX connections. The details of establishing connections between a calling station and the C.O. are known and therefore, no further detail is provided.

The above discussion characterizes the typical elements of the PBX, the establishment of connections between at least two of the stations of the PBX and between at least one station of the PBX and the C.O., and describes processor 108 in response to the receipt of various stimulus from the stations or trunk facilities so as to implement associated call, feature or service processing operations.

As previously described, access to all of the available call, feature or service processing operations may not be permitted and therefore, each station of the PBX and the trunk facility may have associated restrictions that prevent accessing one or more of the available processing operations. The methods or arrangements for restricting stations or facilities are known and are, therefore, not described in details. Additionally, the methods or arrangements comprise no part of the disclosed invention. However, a user may attempt to circumvent the restriction, and, if successful, gain access to unauthorized processing operations. Examples of such activities were previously described with respect to the hotel and corporate environments.

Also, as previously described, a user of a station or trunk facility must meet certain specified conditions which are typically associated with the establishment of calls. If the conditions become atypical such that too short of a duration of time or too long of a duration of time is associated with the station or trunk facility call establishment operations, then potential station or trunk facility misuse, failure or unauthorized user activity is present. Examples of such activities were previously described with respect to electronic automatic dialers and perpetual trunk busy conditions.

If prohibited access occurs which indicates restriction tampering or if an atypical state exists which indicates station or trunk facility misuse, failure or unauthorized user activity, the integrity of each station or the trunk facility comes into question. The following discussion discloses an arrangement which utilizes an algorithm to perform an integrity check of the stations and trunk facilities connected to the PBX. The disclosed algorithm is applicable to detecting the integrity of all communication devices and/or trunk facilities. In addition to performing integrity checks on communication devices connected to a PBX, the arrangement which utilizes the algorithm could also be used to determine the identity of the connected device of a communication system. Each type of device is distinguishable from other types of devices. The detected distinction prevents the unauthorized use of one device over another. For example, a user could attempt to hook-up a modem at a conventional station hook-up. A modem hook-up under this arrangement is used to circumvent billing facilities. Therefore, by detecting the identity of the connected device, the attempt to circumvent the billing facilities is prevented. For ease of description however, only stations of a PBX are discussed. Prior to discussing the details of the algorithm, FIG. 2 illustrates a number of memory tables associated with the operation of the PBX integrity algorithm.

Figure 2:
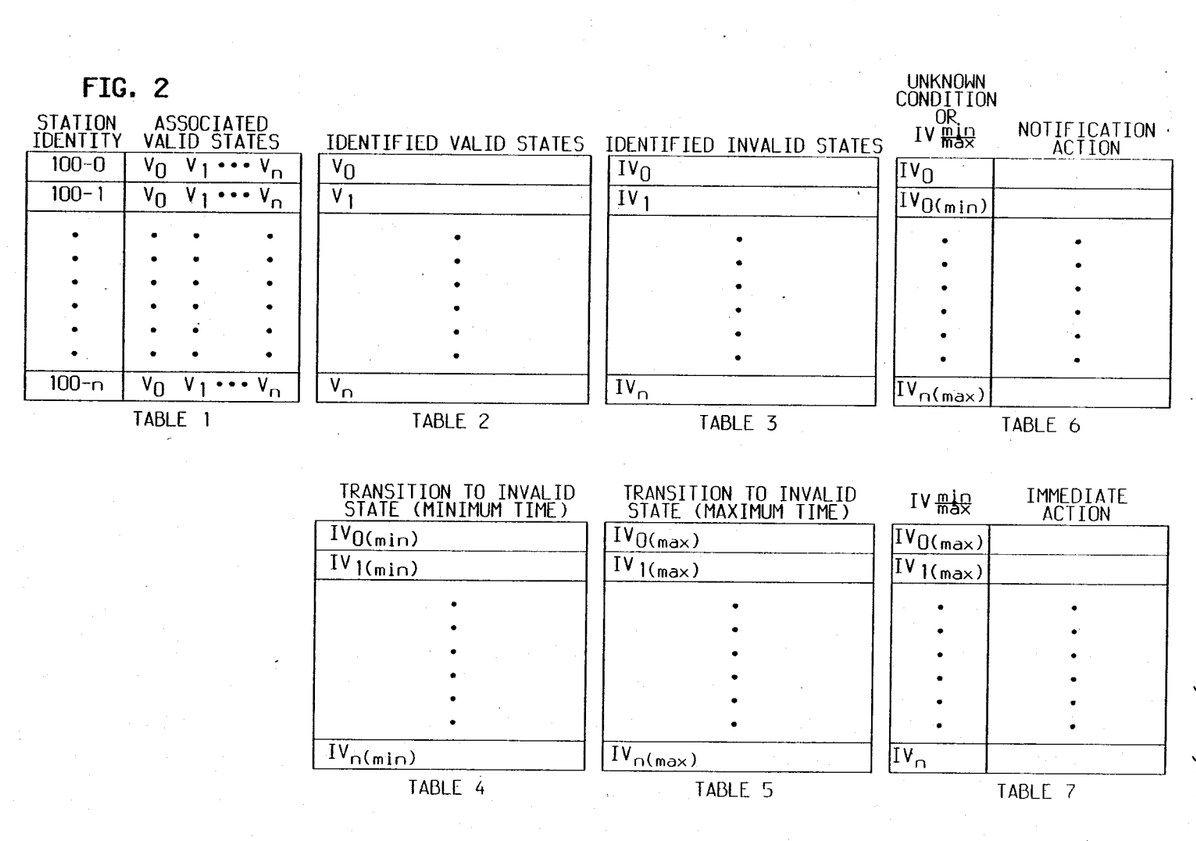
FIG. 2 illustrates a plurality of state tables comprising the memory structure associated with the disclosed PBX integrity processing algorithm arrangement.

FIG. 2 illustrates stable tables 1 through 7 which comprise the contents of main memory 110 of FIG. 1. The information included in each table is programmable by a PBX administrator and, therefore, the information included in each table may be changed and customized for the needs of the associated PBX.

For example, table 2 comprises a list of valid states which, as previously described, are associated with permitted access to one or more specified processing operations of the PBX of FIG. 1. Each entry in table 2 is associated with a specified valid state. For example, $V_0$ indicates a state that permits station to station connections between stations of the PBX and $V_1$ indicates a state that permits 3-way conference calls between stations of the PBX. Alternatively, table 3 comprises a list of invalid states which, as previous described, are associated with prohibited access to one or more specified processing operations of the PBX of FIG. 1. Each entry in table 3 is associated with a specified invalid state. For example, $IV_0$ indicates a state that does not permit a station to C.O. connection and $IV_1$ indicates a state that does not permit access to the call forwarding feature. The PBX administrator programs the entries into the list of states considered valid and invalid for the stations of the PBX. These lists serve as the basis for determining the integrity of the stations comprising the PBX where the existence of a valid state indicates no question of station integrity and the existence of an invalid state indicates a question of station integrity. The PBX administrator attempts to anticipate all the probable states which might occur at each station and selectively assigns a valid, i.e., permitted access, status or invalid, i.e., prohibited access, status to each such state. Either due to error or non-anticipation by the adminstrator, a state may occur which is undefined or unknown; that is, not present as an entry in either the valid or invalid state table. Under these conditions, the occurrence of such a state is considered invalid because it is unknown or undefined and is treated as such. The undefined or unknown state is discussed in more detail subsequently.

As previously described, even though a state is valid, the state may be permitted for some stations, but not for other stations. Table 1 comprises a list of all stations 100-0 through 100-n included in the PBX of FIG. 1. Each station is associated with its permitted valid states. As table 1 illustrates the permitted valid states for station 100-0 are different than the permitted valid states for station 100-1. For example, as previously discussed, station 100-0 may be an executive station and station 100-1 may be a non-executive station. Therefore, the integrity of each PBX station is different from station to station and table 1 defines the valid states associated with each PBX station.

In addition to the occurrence of valid and invalid states, as previously described, the presence of atypical states are also indicative of the integrity of each station. Tables 4 and 5 of FIG. 2 comprise a list of transitional states. The transitional states are those states that change from typical to atypical states. Atypical states, as previously described, are associated with non-conformance to a prescribed set of conditions which are based on the duration of time that a station remains in a valid state. When the time duration in the valid state is either shorter or longer than expected, then typical operation conditions are not met. The occurrence of an atypical condition is defined as an invalid state. Table 4 provides a list of entries associated with transitional valid to invalid states which occur when a valid state exists for less than the expected specified duration of time as timed by the duration timers of system timers 109 of FIG. 1. An example, as previously discussed, is the short duration of the dialing state as caused by an electronic automatic dialer. Alternatively, table 5 provides a list of entries associated with transitional valid to invalid states which occur when a valid state exists for longer than the expected specified duration of time as timed by the duration timers of system timers 109 of FIG. 1. An example, as previously discussed, is a long busy, e.g. 24 hours. Tables 4 and 5 comprise a list of valid transitional states which may be dynamically redefined for a station as invalid when the valid state exists for too short or too long a time interval.

Tables 6 and 7 comprise a list of prescribed actions to be taken in response to the detection of an invalid state. As described above, an invalid state may be of the type included in tables 3, 4 or 5 or may be unknown or undefined state. In particular, table 6 comprises a list of actions that are of the notification type of action. Each detected invalid state is associated with a prescribed notification type of action. A notification type of action either provides a print-out on printer 102 which indicates the existence of an invalid state and/or provides a visual or audio indication on or at attendant console 101 which indicates the existence of an invalid state. The notification type of action provides the PBX administrator with a record of the detection of the invalid state, but does nothing to prevent, interrupt, or terminate the existence of the state at the station associated with the detected invalid state. This allows the PBX administrator the opportunity to study the situation prior to making a decisive move. For example, an executive could be properly using a non-executive phone and therefore, an active interruption at the station would not be appropriate.

Alternatively, table 7 comprises a list of actions that are of the immediate action type. Each detected invalid state that is listed in this table is associated with a prescribed immediate action to prevent the further existence of the detected invalid state at an associated station. An example of an immediate action response is the application of an intercept tone or a disconnect operation to the station associated with an invalid state. The intercept tone or the disconnect operation prevents the persistence or existence of the invalid state. Following the implementation of the immediate action, a follow-up notification action is also taken. Such a notification action may be in the form of a print-out as generated by printer 102. The print-out serves as a generated hard record for the PBX administrator. Such immediate action is useful, for example, in a hotel environment to prevent the continuation of unauthorized long distance calls.

Tables 1 through 7, as described above, comprise the memory structure of main memory 110 as associated with the PBX station integrity algorithm. The following description details the steps involved in the operation of the PBX integrity algorithm. The PBX integrity algorithm operates to detect the integrity of each station of the PBX based on the entries to the tables illustrated in FIG. 2. For ease of description, a single station is checked at one time. However, a plurality of stations may be checked concurrently rather than sequentially. In checking the integrity of a plurality of stations concurrently, two results are possible. One result would indicate which ones of the stations were associated with questions of integrity. Another result would indicate if a pattern of questionable integrity among the stations occurred. The simultaneous occurrence of invalid states is associated with extensive PBX tampering, misuse, malfunction or unauthorized PBX user activity. A table of pattern recognition of invalid states is not illustrated in table 2 and will not be described further since the basic principles are disclosed with respect to the integrity of a single station. The following description discloses an integrity check for a single PBX station at a time. The discussion of this example allows for the least complex explanation.

FIGS. 3–9 illustrate in flowchart form the steps comprising the PBX integrity algorithm which provides a sequential integrity check for each station of the PBX. The algorithm operates continually to monitor the stations of the PBX during conventional call processing operations. Step 300 of FIG. 3 indicates that control processor 108 of FIG. 1 implements the integrity processing operation in response to a service request generated by the PBX administrator and thereafter, the integrity algorithm remains operational until the administrator terminates its operation. Assume that system timers 109 comprising the durational timers and time-of-day timers are operating in the manner previously described, and that the PBX administrator has preprogrammed the state tables illustrated in FIG. 2 with the appropriate state information. Assume further that each station of the PBX is checked according to the sequence of stations listed in table 1 of FIG. 2 such that the first station checked is 100-0, the next is 100-1 and so forth until 100-n is checked. Thereafter, the stations are rechecked again beginning with 100-0. However, the stations need not be checked in the sequence listed in table 1, but may be checked in accordance with any ordering configuration. However, for ease of description, assume the order and sequence listed in table 1 of FIG. 2.

Assume that at step 301, the integrity processing algorithm is in progress. Control processor 108 of FIG. 1 scans table 1 of FIG. 2. At step 302, processor 108 determines if the entire list of stations 100-0 through 100-n as included in table 1 have been scanned, i.e. has station 100-n been checked for integrity? If all the stations have been scanned, i.e. station 100-n has been checked for integrity, processing advances to step 303. At step 303, processor 108 advances to the top of the list or back to station 100-0 to repeat the scanning operation for the entire list of stations included in table 1. Assume, however, that there are further stations, i.e. station 100-n has not been scanned, to be scanned and that processor 108 advances to the next station in the list. Processor 108 at step 304 identifies which station in table 1 is to be scanned. Assume that the identified station from the list of stations in table 1 is station 100-1.

Figure 3:
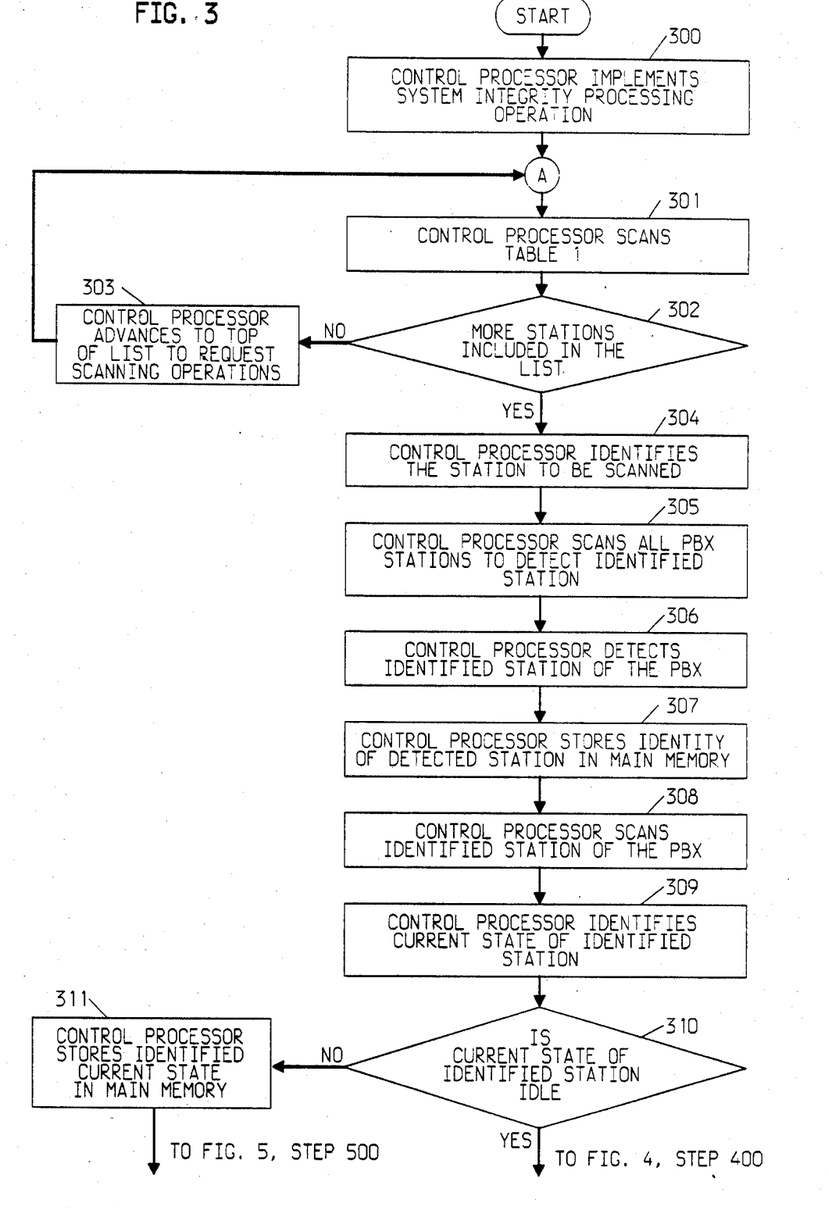
FIGS. 3-9 illustrate a flow chart identifying the processing steps comprising the PBX integrity processing algorithm arrangement.

Processor 108, following the identification of station 100-1, scans, at step 305, all stations 100-0 through 100-n of the PBX of FIG. 1 to detect the identified station, i.e., station 100-1. Processor 108, at step 306, detects station 100-1 from among stations 100-0 through 100-n and then, stores at step 307, the identity of detected station 100-1 in main memory 110. Processing operations advance to step 308 where processor 108 scans detected station 100-1. As previously described, processor 108 receives stimulus indications from each station of the PBX. The stimulus indication represents the state, i.e. busy or idle, of the associated station. Processor 108, at step 309, identifies the current state of station 100-1. Assume that the current state of station 100-1 is idle, i.e. "on-hook", as determined at step 310. In response to the detection of the current idle state at station 100-1, processor 108 advances processing operations to step 400 of FIG. 4.

Figure 4:
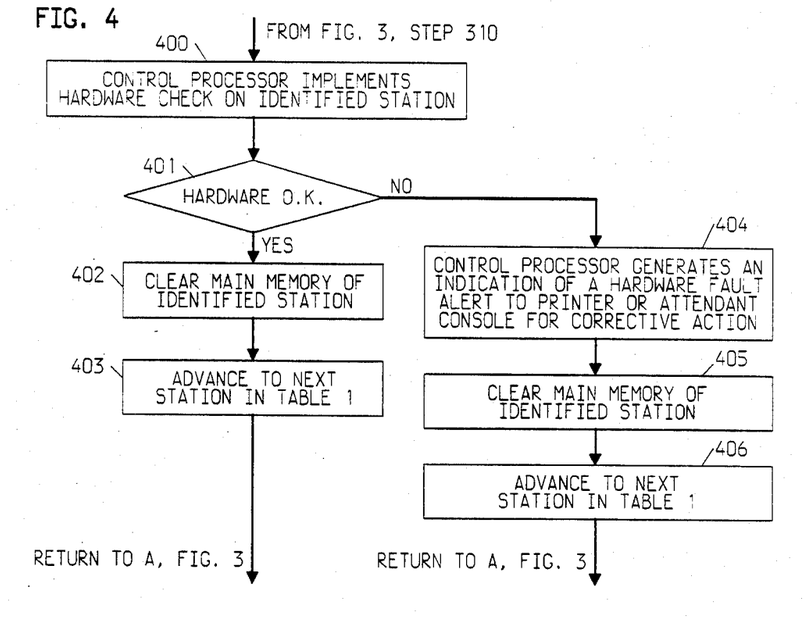

FIG. 4 comprises processing steps 400 through 406. These steps of the algorithm define the processing steps which serve to administer a hardware test to identified station 100-1. Processor 108 administers a hardware test only when a station is in an idle state, i.e. "on-hook", because a hardware check typically requires sending electrical signals to the station set to detect if the station set is properly connected. The generation of electrical signals during any other state disrupts the processing operations associated with an "off-hook" state. Processor 108, in response to the detection of an idle state, implements, at step 400, a hardware test on identified station 100-1. The hardware test may be of the type described in U.S. Pat. No. 4,523,183 and U.S. Pat. No. 4,485,437. Assume that the hardware test result, at step 401, yields a fault detection indicating that station 100-1 is disconnected. Processor 108, in response to the fault detection, generates, at step 404, an indication of a detection of a hardware fault either to attendant console 101 or printer 102. This indication provides notification of the existence of the fault to the PBX administrator. The administrator, in response to the notification, may then provide corrective action for identified station 100-1 associated with the detected fault. Following the generation of notification of the hardware fault, processor 108 clears, at step 405, main memory 110 of identified station 100-1. This indicates that the integrity check of station 100-1 is concluded. Processor 108, then, advances, at step 406, to the next station to be scanned as listed in table 1 of FIG. 2. The processing operation returns to point A of FIG. 3 to continue further integrity processing operations on the next station, i.e., 100-2, in the sequence.

Assume, now, that at step 401 no hardware fault is detected. Processor 108, in response to no fault detection, i.e. "hardware O.K.", clears, at step 402, main memory 110 of the identified station 100-1 currently being scanned. This indicates that the integrity check of station 100-1 is concluded. Processor 108, then, advances, at step 403, to the next station in table 1 of FIG. 2 to be scanned. The processing operation returns to point A of FIG. 3 to continue further integrity processing operations on the next station, i.e., 100-2, in the sequence.

Figure 5:
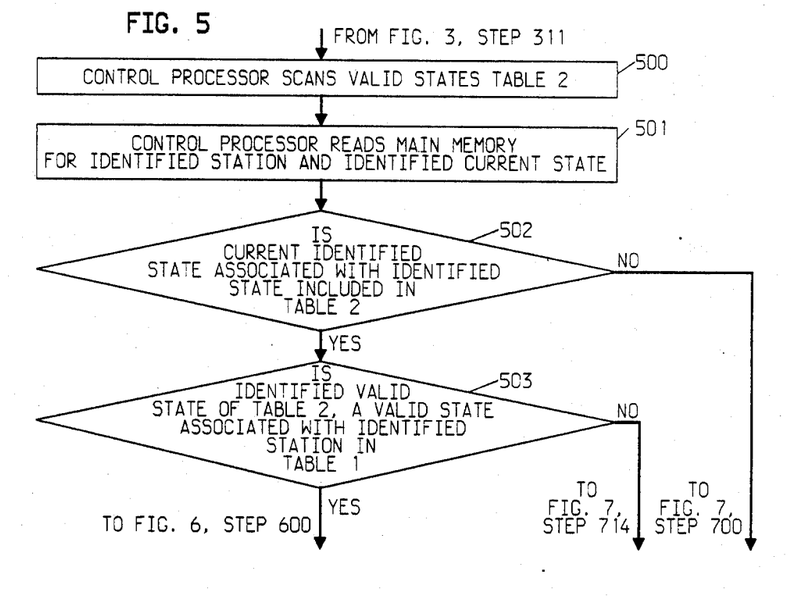
Figure 7:
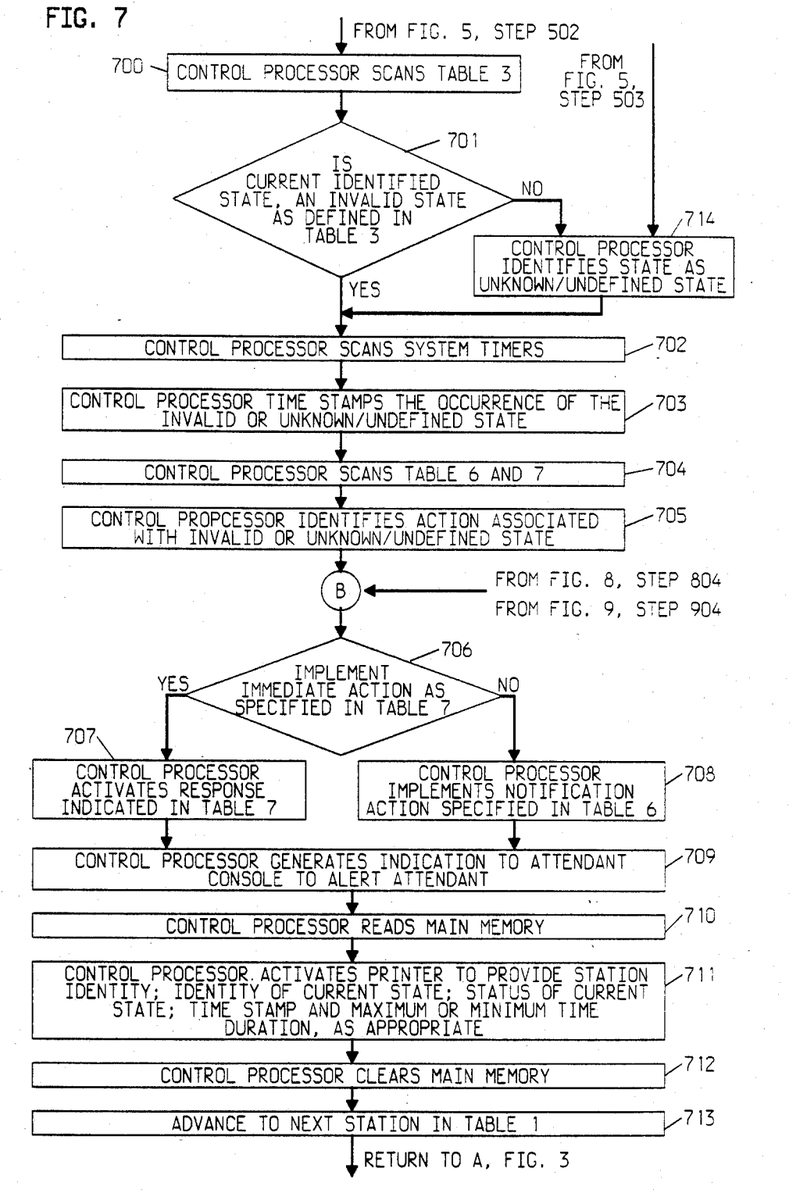

The above describes the operations of the integrity processing algorithm with respect to stations in the idle, i.e. "on-hook", state. Now, assume that at step 310 of FIG. 3 that the detected current state of station 100-1 is not idle, and therefore processing advances to step 311. Processor 108, in response to the negative determination at step 310, stores, at step 311, the identified current state in main memory 110. Assume that the current identified state of station 100-1 is "busy", i.e., "off-hook", and that the "busy" state is associated with a C.O. call connection. It is well-known in the art, that a control processor of the PBX maintains call progress record tables (not shown) in its main memory 110. The call progress record tables contain information as to the calling and called numbers, duration of call, type of call, etc. and therefore, the call progress record tables indicate to the control processor the current status of the call connection associated with each station of the PBX. Since the existence of all progress record tables is well-known, no further detail is required. Therefore, the control processor access the call progress record tables to determine the current status of a station. Processing advances to step 500 of FIG. 5. FIGS. 5 and 7 describe the steps associated with determining the existence of valid and invalid states as listed in tables 2 and 3, respectively, of FIG. 2.

At step 500, processor 108 scans table 2 of FIG. 2. As previously described, table 2 comprises a list of valid states for the stations of the PBX of FIG. 1. While scanning table 2, processor 108, at step 501, concurrently reads main memory 110 for the stored identified station 100-1, and the stored identified current state, i.e., busy and a C.O. connection. At step 502, processor 108 performs a comparison operation between the identified current state and the list of valid states included in table 2. Assume that the identified current state matches one of the valid states of table 2. A match under these conditions indicates that the detected current state is one of the permitted conditions for the stations of the PBX. Processor 108, following the comparison, then, compares, at step 503, the validated identified current state with the valid states associated with identified station 100-1 as listed in table 1. Assume that the validated identified current state as associated with station 100-1 matches the list of valid states normally associated with station 100-1 as defined in table 1. A match under these conditions indicates that the detected current state is permitted for station 100-1. The call connection via the C.O. is permitted. Therefore, the integrity of station 100-1 following these checks is confirmed. Processor 108, following the comparison with the associated valid states of table 1, advances the processing operations to step 600 of FIG. 6.

Now, assume that the identified current state of station 100-1, at step 502, does not match any of the states listed in valid states table 2. Processor 108, in response to the occurrence of a no match, advances to step 700 of FIG. 7. Processor 108 scans table 3. As previously described, table 3 comprises a list of invalid states for the stations of the PBX in FIG. 1. Processor 108, at step 701, compares the current identified state, i.e., "busy" and connected to the C.O., of station 100-0 with the invalid states comprising Table 3. Assume that the current identified state matches one of the invalid states listed in table 3. This indicates that the current status of "busy" and connected to the C.O. is not permitted. This further indicates that a party at the identified station has circumvented the restriction associated with identified station 100-1. In response to the match between the current identified state and one of the invalid states listed in table 3, processor 108 scans, at step 702, system timers 109 and, in particular, the time-of-day timer to determine the time-of-day the occurrence of the invalid state was detected by processor 108. Processor 108, following the determination of the time-of-day, time stamps, at step 703, the occurrence of the detectiion of the invalid state. Processor 108 has access to several pieces of information at this time including the identity of the station, the current identified state as represented by the call progress record table, the information indicative of the current state being an invalid state, and time-of-day the invalid state was detected. Processor 108 may additionally have access to other pieces of information, but the type of information available is dependent on a particular PBX embodiment. No further detail is provided since several types of PBX embodiments supplying different types of information are known. The above-described information is conventionally associated with the present described embodiment. Processor 108 scans, at step 704, tables 6 and 7, respectively. As previously described, tables 6 and 7 identify a list of appropriate actions, either notification action or immediate action, in response to an identified invalid state as listed in either table.

Processor 108 identifies, at step 705, which table contains the appropriate action associated with the detected invalid state. Processor 108 identifies the specified action required in response to the detected invalid state as it appears in either table 6 or 7 at step 706. If the invalid state is not included in the list of immediate actions listed in table 7, processor 108 implements, at step 708, the notification action associated with the invalid state as specified in table 6. In addition to any other notification response operations as indicated in table 6, processor 108 generates, at step 709, an indication and applies this indication to attendant console 101 of FIG. 1. This indication alerts the attendant that an invalid state exists at one of the stations of the PBX, and that the attendant should consult a print-out from printer 102 for further information. Processor 108 reads, at step 710, main memory 110 and identifies the offending station and its associated current identified state. This stored information and the information previously described provides a record containing information with respect to the integrity of station 100-1. Processor 108 generates, at step 711, an activation signal and applies this signal to printer 102 to activate the printer. Processor 108, then, generates a series of indications representing the above-described information and applies these indications to active printer 102. In response to the receipt of these indications, printer 102 provides a print-out containing the identity of the offending station, i.e. station 100-0, the identity of the detected current state i.e., "busy" and connected to the C.O., that the identified current state is invalid and a time stamp indicating the time-of-day the invalid state was detected. Following the generated output of this information by printer 102, processor 108 clears, at step 712, main memory 110 of the stored information, i.e. station 100-1 and current identified state. Processor 108, then, advances, at step 713, to the next station, i.e., 100-2, to be scanned as indicated by table 1 of FIG. 2. The processing operation returns to point A of FIG. 3 to continue further integrity processing operations on the next station in the sequence.

Assume, now, that, at step 706, the detected invalid state is listed in table 7 and therefore, an immediate action is required in response to the detection of this invalid state. Table 7 indicates what type of immediate action is required in response to the detected invalid state. Such a response may be to immediately disconnect the connection between the station and the C.O. or provide for attendant intrusion. Processor 108 activates, at step 707, the associated response indicated in table 7 so that an immediate action is taken to prevent the persistence of the invalid state at the offending station. Following the activation of immediate response as specified in table 7, processor 108 advances processing to step 709. Processing progresses through steps 709 through 713 in the manner previously described. Therefore, in cases where immediate action is specified in response to a detected invalid state, notification action is also taken to provide a record of the occurrence and to notify the PBX administrator. Processing, then, returns to point A of FIG. 3.

Now, assume, that at step 701 of FIG. 7 the detected current identified state was not included in the list of invaid states comprising table 3. At this time, the detected current state is neither valid nor invalid as defined by the tables 2 and 3, respectively. Under these conditions, processor 108 advances processing operations to step 714. As previously described, a state which is neither valid or invalid as defined by the tables is as an "unknown" or "undefined" state. The existence of an unknown or undefined state is the result of either one of two conditions. One condition which accounts for the presence of an "unknown" or "undefined" state is that the state was not anticipated by the PBX administrator at the time the administrator programmed the valid and invalid states into the tables. The second condition which accounts for the presence of the "unknown" or "undefined" state may be the result of a data processing error so that the apparent detected state may not be an actual state, but is an error condition. Therefore, step 714, provides for a fail-safe condition whereby the detected state is either the result of processing error such that its existence may be ignored by the administrator or the result of non-anticipation by the PBX administrator such that its existence may be noted by the administrator for future programming. In any case, whether the state is invalid, or unknown or undefined, the presence of the state will be recorded by the operation of the algorithm. Following the identification of the state as "unknown" or "undefined" at step 714, processing advances through steps 702 through 713 in the manner previously described. However, since the detection of an "unknown" or "undefined" state is tenuous, no immediate action, at step 706, is taken. At step 711, the print-out as generated by printer 102 will indicate the status of the detected state as "unknown" or "undefined". The PBX administrator may then determine the appropriate action based on the information contained in the print-out. Processing advances through steps 712 and 713 as previously described and returns to A of FIG. 3 to scan the next station, i.e., 100-2, in the sequence.

Now, assume that at step 502 of FIG. 5, the detected current identified state is a valid state as listed in table 2. However, at step 503, assume that the detected current state is not a valid state that is normally associated with the identified station as indicated by the list comprising table 1. For example, a non-executive station currently engaged in an unauthorized call connection to a C.O. Under this condition, processor 108 advances processing to step 714 of FIG. 7. As previously described, at step 714, processor 108 defines a current state as "unknown" or "undefined" state if the state does not appear in either table 2 or 3. However, as previously mentioned, a particular state may be valid in table 2, but not be an associated valid state for a particular station. Under these conditions, the processor defines the currently identified state as "undefined" for identified station 100-1. Following the identification of the state as undefined for identified station 100-1 processing advances through steps 702 through 713 as previously described. Again, no immediate action at step 706 is taken with respect to the detection of an undefined state since the presence of the undefined state may be validated after scrutiny by the PBX administrator. For example, the connection is permissible for an executive user accidentally using a non-executive station. At step 711, the print-out as generated by printer 102 will indicate the status of the detected state as "undefined" for the identified station. The PBX administrator may then determine the appropriate action based on the information contained in the print-out. Processing advances through steps 712 and 713 as previously described and returns to A of FIG. 3 to scan the next station, i.e., station 100-2, in the sequence.

Figure 6:
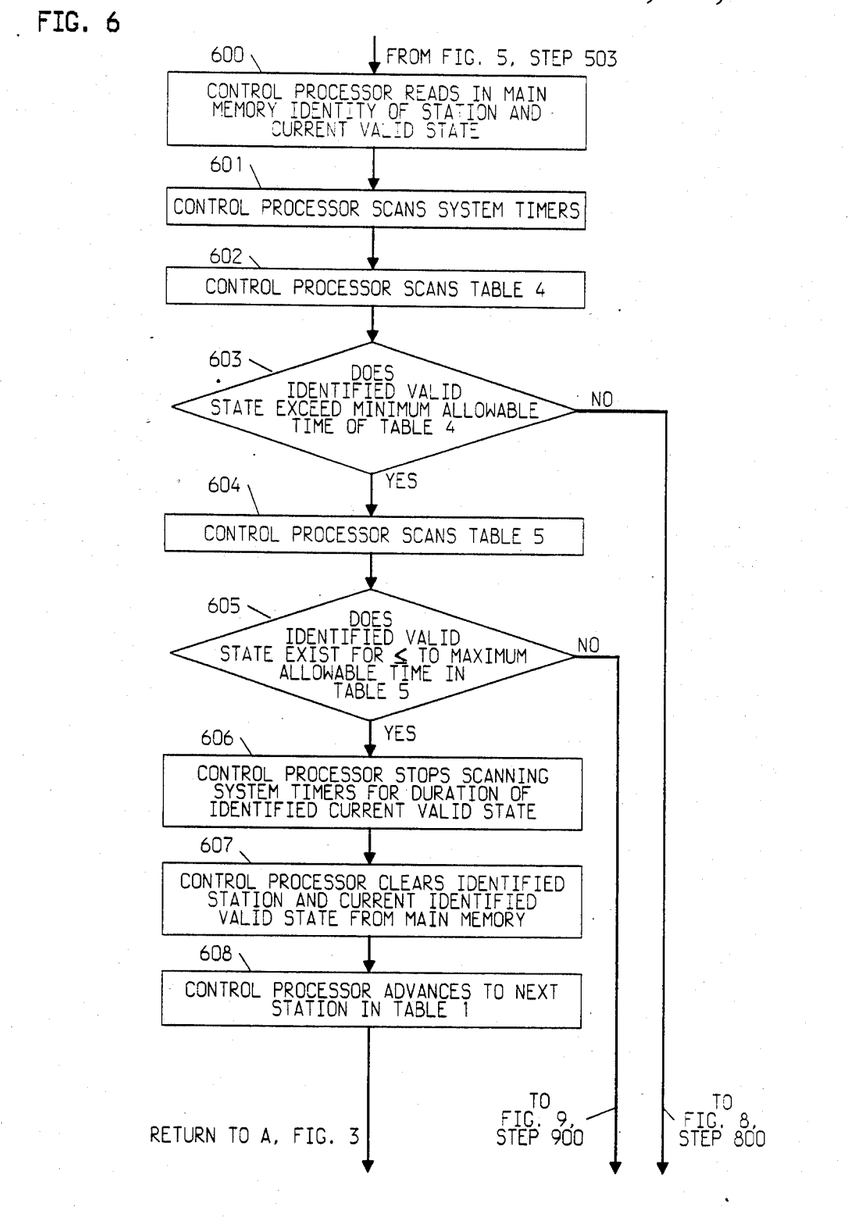
Figure 8:
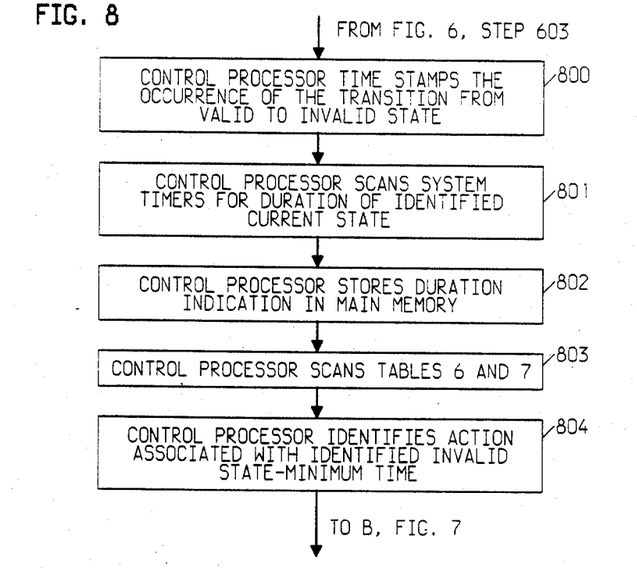
Figure 9:
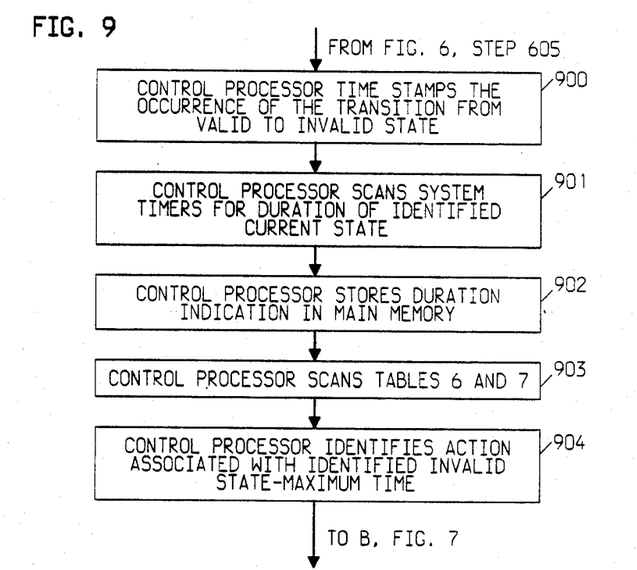

Assume, now, that at steps 502 and 503, respectively, of FIG. 5, the detected current identified state is a valid state associated with the identified station and therefore, the identified current state associated with identified station 100-1 is permitted. In response to these conditions, as previously indicated, processor 108 advances processing to step 600 of FIG. 6. FIGS. 6, 8 and 9 represents the steps associated with detecting the transitional states which occur when a valid state exists either for too short or too long a time duration.

Processor 108 reads, at step 600, the contents of main memory 110 which includes station identity 100-1 and an identification of a current valid state. As previously described, with the occurrence of each change of state, system timers 109 of FIG. 1 comprising the duration timers are continually operational. These duration timers, as previously described, indicate the length of time each station remains in a valid state. Processor 108 scans, at step 601, duration timers to determine the length of time associated with the existence of the currently identified state at identified station 100-1. Following the scanning of the duration timers to ascertain the time duration of the identified current state, processor 108, at step 602, scans table 4. As previously described, Table 4 is a transitional state table which indicates the transition from a valid to an invalid state when a minimum time duration for a particular state does not occur. The minimum time duration may be indicative of station integrity problems such as of the type previously described.

Assume that, at step 603, the current identified state meets or exceeds the minimum allowable time for the existence of the current identified state. This indicates that the duration of the state at the identified station is typical and that no irregularities or station integrity problems exist. Processor 108 advances the processing operation to step 604. Processor 108 scans table 5. As previously described, table 5 is a transitional table which indicates the transition from a valid to an invalid state when a maximum time duration for a particular state is equal to or greater than an expected time duration. When the duration of time associated with the current identified state does not exceed the maximum expected specified time duration, this is indicative that the duration of the state at the identified station is typical and no station integrity problems such as of the type previously described exist.

Assume that, at step 605, the identified current state exists for less than the maximum expected specified allowable time duration. In response to this determination, processor 108 advances processing to step 606 and stops scanning the duration timers of system timers 109 since all the time duration requirements are of a typical duration. Processor 108, then, clears, at step 607, main memory 110 of the stored information, i.e. the identified station and the associated current identified state. This indicates that the integrity check of station 100-1 is confirmed. Processor 108, then advances, at step 608, to the next station, i.e., 100-2, to be scanned as indicated by table 1 of FIG. 2. The processing operation returns to point A of FIG. 3 to continue further integrity processing operations on the next station in the sequence. At this point in processing, identified station 100-1 exists in a valid state and meets all typical processing time requirements. The integrity of the station 100-1 is verified.

Now, assume that, at step 603, the minimum time duration requirement for the current identified state was not met. This indicates that an atypical time duration. Atypical time durations indicate station integrity problems. In response to the detection of this condition, processing advances to step 800 of FIG. 8. Control processor 108, at step 800, time stamps the occurrence of the transition from valid to invalid by rading the time-of-day timer in the manner previously described. Processor 108 scans, at step 801, the duration timers of system timers 109 to record an indication of the duration of time that station 100-1 remained in the transitional invalid state and stores, at step 802, the indication in main memory 110. Processor 108 scans, at step 803, tables 6 and 7, respectively, to determine the appropriate action in response to the detected transitional state as listed in table 4. The processor operates in the same manner previously described with respect to invalid states and the associated actions specified in tables 6 or 7. Processor 108 identifies, at step 804, which table includes the detected transitional invalid state resulting from the minimum time duration requirement. Following the identification of which table contains the appropriate associated response action, processing branches to point B of FIG. 7 and carries out steps 706 through 713 in the manner previously described. At step 711, the generated print-out from printer 102 will indicate that the invalid state resulted from the detection of an atypical minimum amount of time duration in the valid state. Following the implementation of the appropriate actions, the processing operations return to point A of FIG. 3 to continue the integrity check of the next station, i.e., 100-2, in the sequence.

Assume, now, that, at step 605, of FIG. 6 the maximum typical time duration for a valid state was exceeded. This indicates that the integrity of the station is in question. In response to this condition, processing advances to step 900 of FIG. 9. Processor 108, at step 900, time stamps the occurrence of the transition from valid to invalid by reading the time-of-day timer in the manner previously described. Processor 108, at step 901, scans the duration timers of system timers 109 to record an indication of the duration of time that station 100-1 remained in the transitional invalid state and stores, at step 902, the indication in main memory 110. Processor 108 scans, at step 903, tables 6 and 7, respectively, to determine the appropriate action in response to the detected transitional state as listed in table 5. The processor operates in the same manner previously described with respect to invalid states and associated actions specified in tables 6 and 7. Processor 108 identifies, at step 904, which table includes the detected transitional invalid state resulting from the maximum time duration requirement. Following the identification of which table contains the appropriate associated response action, processing branches to point B of FIG. 7 and carries out steps 706 through 713 in the manner previously described. At step 711, the generated print-out from printer 102 will indicate that the invalid state resulted from the detection of an atypical duration of time which exceeds the maximum expected time associated with a valid state. Following the implementation of the associated actions, the processing operations returns to point A of FIG. 3 to continue the integrity check of the next station, i.e., 100-2, in the sequence.

The described PBX integrity algorithm performs processing operations which monitor a plurality of different types of communication devices or trunk facilities connected to a PBX or a communication system to detect the occurrence of prohibited access to processing operations or atypical call establishment conditions. The detection of the existence of these occurrences or conditions indicates restriction tampering, device or trunk facility misuse, failure or unauthorized user activity. In response to the detection of these conditions, the control processor generates and applies either a notification action to an attendant console or a printer and/or an immediate action to the offending device or facility. The algorithm provides a continual check on the integrity of the devices and trunk facilities connected to the PBX or communication system.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a PBX having a plurality of communication devices and trunk facilities where each of said communication devices and said trunk facilities are connected to a corresponding port circuit of said PBX and which PBX operates under control of a processor, a method for checking the integrity of each of said communication devices and said trunk facilities wherein said method comprises the steps of:

storing a finite list of communication device invalid states each of which represents a lack of integrity of said communication devices;

polling on a periodic basis all of said communication devices to detect a current state of each of said communication devices;

comparing for each of said communication devices said detected current state with said list of communication device invalid states to determine if a match exists between said current state and one of said communication device invalid states; and providing in response to the existence of a match at one of said communication devices, an action indicative of the occurrence of a communication device invalid state at said one communication device.

2. The method of claim 1 wherein said method further comprises the steps of:

storing a finite list of valid states each of which represents an existence of integrity of said communication devices;

comparing for each of said communication devices said detected current state with said list of valid states to determine if a match exists between said detected current state and one of said valid states; and verifying that said current state is a valid state when a match occurs between said current state and at least one of said valid states.

3. The method of claim 1 wherein said method further comprises the steps of:

storing a finite list of invalid transitory states where each of said invalid transitory states is associated with a prescribed duration of time;

scanning a plurality of duration timers to detect the duration of time associated with the existence of a detected transitory current state at one of said communication devices;

comparing said duration of time associated with said detected transitory current state and said duration of time associated with one of said invalid transitory states;

responding to the existence of a match to identify said detected transitory current state as an invalid state; and providing an action indicative of the occurrence of said invalid state at said one communication device associated with said invalid transitory state.

4. The method of claim 3 wherein said storing step includes the steps of:

identifying said invalid transitory states associated with said prescribed duration of time less than an expected duration of time associated with the occurrence of a valid state; and identifying said invalid transitory states associated with said prescribed duration of time greater than or equal to an expected duration of time associated with the occurrence of a valid state.

5. The method of claims 1 or 2 wherein said method further comprises the steps of:

identifying said detected current state as an unknown state when no match occurs between one of said valid states and said detected current state or one of said invalid states and said detected current state; and responding to said identification of said unknown state to provide an action indicative of the occurrence of said unknown state at said communication device.

6. The method of claim 1 or 2 wherein said method further comprises the steps of:

storing a finite list of said communication devices where each of said communication devices is associated with a prescribed list of valid states;

identifying said specified communication device included in said list to determine the associated prescribed list of valid states for said specified communication device;

comparing said detected verified current state of said specified communication device with said prescribed list of valid states for said specified communication device;

specifying said detected current state as an undefined state when no match occurs between said detected current state and one of said valid states included in said associated prescribed list of valid states for said specified communication device; and providing in response to said identification of said undefined state, an action indicative of the occurrence of said undefined state at said specified communication device.

7. The method of claim 1 wherein said providing steps includes the steps of:

activating an immediate action to provide a cessation of the occurrence of said invalid state;

generating a visual indication at an attendant console to indicate the occurrence of said invalid state; and generating a readable indication at a notification generating device to indicate the occurrence of said invalid state.

8. In a PBX having a plurality of communication devices and central office trunks where each of said communication devices and central office trunks are connected to a corresponding port circuit of said PBX wherein a control processor serves said communication devices and said central office trunks, a method for determining the integrity of each communication device and central office trunk during the occurrence of one or more of said communication devices accessing one or more calling processing operations, wherein said method comprises the steps of:
  storing a finite list of communication device invalid states associated with prohibited access to one or more PBX call processing operations;
  polling a selected one of said call processing operation accessing communication devices to detect a current state associated with the one or more call processing operations accessed by said selected communication device;
  comparing said detected current state with said list of communication device invalid states to determine if a match exists between said current state and one of said communication device invalid states; and
  responding to the existence of a match to provide an action indicative of the occurrence of a communication device invalid state at said selected communication device representing a lack of integrity at said selected communication device where the access to said call processing operation associated with said current state at said selected communication device is prohibited.

9. The method of claim 8 wherein said method further comprises the steps of:
  storing a finite list of valid states associated with permitted access to one or more call processing operations;
  comparing said detected current state with said list of valid states to determine if a match exists between said current state and one of said valid states; and
  verifying that said current state is a valid state when a match occurs between said current state and at least one of said valid states indicating permitted access to said call processing operation associated with said current state of said selected communication device.

10. The method of claims 8 or 9 wherein said method comprises the steps of:
  storing a finite list of invalid states associated with less than a minimum amount of time expected for remaining in a valid state;
  scanning a plurality of duration timers to detect the duration of time said selected communication device remains in said detected verified current state;
  comparing the duration of time said selected communication device remains in detected verified current state with said list of invalid states associated with less than a minimum amount of time expected for remaining in a valid state; and
  providing in response to the occurrence of a match between said detected verified current state and one of said invalid states, an action indicative of said time duration of said detected verified current state existing for a shorter duration of time than expected for remaining in a valid state representing a lack of integrity at said selected communication device.

11. The method of claims 8 or 9 wherein said method comprises the steps of:
  storing a finite list of invalid states associated with more than or equal to a maximum amount of time expected for remaining in a valid state;
  scanning a plurality of duration timers to detect the duration of time said selected communication device remains in said detected verified current state;
  comparing the duration of time said selected communication device remains in said detected verified current state with said list of invalid states associated with more than or equal to a maximum amount of time expected for remaining in a valid state; and
  providing in response to the occurrence of a match between said detected verified current state and one of said invalid states, an action indicative of said time duration of said detected verified current state existing for a longer duration of time than expected for remaining in a valid state representing a lack of integrity at said selected communication device.

12. The method of claims 8 or 9 wherein said method further comprises the steps of:
  identifying said detected current state as an unknown state when no match occurs between one of said valid states and said detected current state or one of said invalid states and said detected current state; and
  providing in response to said identification of said unknown state associated with neither a permitted or non-permitted access to one or more processing operations, an action indicative of the occurrence of said unknown state at said selected communication device.

13. The method of claims 8 or 9 wherein said method further comprises the steps of:
  storing a finite list of said communication devices where each of said communication devices is associated with a specified list of valid states where said specified list indicates permissible access to a subset of processing operations which are only available to certain ones of said communication devices;
  identifying said selected communication device in said list to determine an associated subset of valid states for said selected communication device;
  comparing said detected verified current state of selected communication device with said associated subset of valid states for said selected communication device;
  specifying said detected verified current state as an undefined state when no match occurs between one of said valid states included in said associated subset of valid states and said detected verified current state at said selected communication device; and
  providing in response to said identification of said undefined state associated with prohibited access to one or more processing operations, an action indicative of the occurrence of said undefined state at said selected communication device.

14. The method of claim 8 wherein said providing step includes the step of:
  activating an immediate action to provide a cessation of the occurrence of said invalid state when said detected current state is invalid as defined by an immediate action table.

15. The method of claim 8 wherein said providing step includes the steps of:

generating a visual indication at an attendant console to indicate the occurrence of said invalid state when said detected current state is invalid as defined by a notification action table; and generating a readable indication at a notification generating device to indicate the occurrence of said invalid state when said detected current state is invalid as defined by said notification action table.

16. In a PBX having a plurality of communication devices including port circuits and trunk facilities including port circuits and which PBX operates under control of a processor, a method for concurrently checking the integrity of each of said devices and said trunk facilities via associated port circuits wherein said method comprises the steps of:

storing a finite list of valid states;

storing a finite liste of invalid states;

scanning said devices and said trunk facilities to select one of said port circuits to be scanned;

detecting a current state of said one port circuit;

comparing said detected current state with said list of valid states to determine if a match exists between said states;

verifying that said detected current state is valid when said match exists;

comparing said detected current state with said list of invalid states to determine if a match exists between said states when no match exists between said current state and said valid state; and activating a notification indication when a match exists between said current state and said invalid state to indicate a lack of integrity of said one port circuit's associated device or trunk facility.

17. The method of claim 16 wherein said method further includes the steps of:

identifying said detected current state as an unknown state when no match occurs between one of said invalid states and said current state; and responding to said identification of said unknown state to provide an action indicative of the occurrence of said unknown state of said one port circuit.

18. The method of claim 16 wherein said method further includes the steps of:

storing a finite list of port circuits where each of said port circuits is associated with a set of valid states;

identifying said one port circuit in said list to determine an associated set of valid states for said one port circuit;

comparing said detected current state of said one port circuit with said identified port circuit of the list having said associated set of valid states;

specifying said detected current state as an undefined state when no match occurs between said detected current state and said associated set of valid states; and responding to said identification of said undefined state to provide an action indicative of the occurrence of said unknown state at said one port circuit.

19. In a PBX having a plurality of communication devices including port circuits and trunk facilities including port circuits and which PBX's operate under control of a processor, a method for checking the integrity of each of said device and said trunk facilities wherein said method comprises the steps of:

storing a finite list of invalid transitory states where each of said invalid transitory states is associated with a prescribed duration of time;

scanning said devices and said trunk facilities to select one of said port circuits to be scanned, detecting a current state of said one port circuit;

scanning a plurality of duration timers to detect the duration of time associated with the existence of said detected current state of said one port circuit;

comparing said duration of time associated with said detected current state and said duration of time associated with one of said invalid transitory states; and activating a notification indication when a match exists between said detected current state and one of said invalid transitory state indicative of a contravention of said prescribed duration of time.

20. The method of claim 19 wherein said step of storing further comprises the steps of:

identifying a set of said invalid transitory states associated with said prescribed duration of time less than an expected duration of time associated with the occurrence of a valid state; and identifying a set of said invalid transitory states associated with said prescribed duration of time greater than or equal to an expected duration of time associated with the occurrence of a valid state.

21. In a PBX having a plurality of communication device each connected to a corresponding port circuit of said PBX and which PBX operates under control of a processor, a method for checking the integrity of each of said communication devices wherein said method comprises the steps of:

storing a finite list of identifiers for each of said communication devices;

polling said communication devices to select one of said communication devices;

detecting the identity of said one selected communication device;

comparing said detected identity with said list of identities to determine if a match exists between said detected identity and a one of said identities in said list of identities;

verifying that said detected identity is a valid identity for said selected communication device when a match exists; and activatinhg a notification indication when no match exists between said detected identity and said identities in said list of identities to indicate a lack of integrity of said selected communication device.

* * * * *